US012679323B2

(12) United States Patent
Shi et al.

(10) Patent No.: US 12,679,323 B2
(45) Date of Patent: Jul. 14, 2026

(54) AUTONOMOUS-DRIVING HYDRAULIC STEERING MODIFICATION CONTROL SYSTEM AND CONTROL METHOD

(71) Applicant: BEIJING NAVAGRAHA INTELLIGENT TECHNOLOGY CO., LTD., Beijing (CN)

(72) Inventors: Liang Shi, Beijing (CN); Lei Wang, Beijing (CN); Yonggao Mo, Beijing (CN)

(73) Assignee: BEIJING NAVAGRAHA INTELLIGENT TECHNOLOGY CO., LTD., Beijing (CN)

( * ) Notice: Subject to any disclaimer, the term of this patent is extended or adjusted under 35 U.S.C. 154(b) by 9 days.

(21) Appl. No.: 18/701,927

(22) PCT Filed: Sep. 7, 2023

(86) PCT No.: PCT/CN2023/117558
§ 371 (c)(1),
(2) Date: Apr. 17, 2024

(87) PCT Pub. No.: WO2024/051786
PCT Pub. Date: Mar. 14, 2024

(65) Prior Publication Data
US 2024/0409081 A1      Dec. 12, 2024

(30) Foreign Application Priority Data
Sep. 8, 2022     (CN) .......................... 202211105656.0

(51) Int. Cl.
*B60W 10/20*          (2006.01)
*B62D 5/06*           (2006.01)
(Continued)

(52) U.S. Cl.
CPC ............. *B60W 10/20* (2013.01); *B62D 6/002* (2013.01); *B62D 5/062* (2013.01); *B62D 15/022* (2013.01)

(58) Field of Classification Search
CPC ....... B60W 10/20; B62D 6/002; B62D 5/062; B62D 15/022; B62D 5/04; B62D 5/06;
(Continued)

(56) References Cited

U.S. PATENT DOCUMENTS

| | | | | |
|---|---|---|---|---|
| 4,719,981 A | * | 1/1988 | Miyoshi | ............... B62D 7/1581 180/412 |
| 5,065,325 A | * | 11/1991 | Takahashi | .............. B62D 5/049 180/404 |

(Continued)

FOREIGN PATENT DOCUMENTS

| | | |
|---|---|---|
| CN | 105128929 A | 12/2015 |
| CN | 112026912 A | 12/2020 |

(Continued)

OTHER PUBLICATIONS

International Search Report of PCT Patent Application No. PCT/CN2023/117558 issued on Nov. 16, 2023.

(Continued)

*Primary Examiner* — Scott A Reinbold

(57) ABSTRACT

An autonomous-driving hydraulic steering modification control system disclosed by this application includes a steering wheel, a hydraulic steering mechanism and a turning wheel, the hydraulic steering mechanism is connected with the steering wheel and the turning wheel respectively, the steering wheel is connected with the hydraulic steering mechanism through a first rotating shaft and a second rotating shaft, one end of the first rotating shaft is connected with the steering wheel, the other end of the first rotating shaft is connected with one end of the second rotating shaft through a steering connector, the other end of the second (Continued)

rotating shaft is connected with the hydraulic steering mechanism, and a steering motor is arranged on the second rotating shaft and is configured to drive the hydraulic steering mechanism to rotate so as to make the turning wheel rotate.

5 Claims, 6 Drawing Sheets

(51) Int. Cl.
  B62D 6/00 (2006.01)
  B62D 15/02 (2006.01)
(58) Field of Classification Search
  CPC .... B62D 15/025; B62D 5/064; B62D 5/0481;
    B62D 5/14; B62D 5/18; B62D 15/023
  USPC ........................................................ 701/41
  See application file for complete search history.

(56) References Cited

U.S. PATENT DOCUMENTS

| | | | | | |
|---|---|---|---|---|---|
| 2004/0182640 | A1* | 9/2004 | Katou | .................... | B62D 5/049 |
| | | | | | 180/446 |
| 2009/0312911 | A1* | 12/2009 | Matthews | ............ | A01B 69/007 |
| | | | | | 701/42 |
| 2010/0168964 | A1* | 7/2010 | Higashi | .................. | B62D 5/008 |
| | | | | | 701/42 |

| | | | | | |
|---|---|---|---|---|---|
| 2018/0009470 | A1* | 1/2018 | Meyer | ................. | B60W 10/184 |
| 2021/0362776 | A1* | 11/2021 | Nagano | .................... | B62D 5/06 |
| 2024/0083466 | A1* | 3/2024 | Jang | .................. | B60W 60/0053 |

FOREIGN PATENT DOCUMENTS

| | | |
|---|---|---|
| CN | 112477977 A | 3/2021 |
| CN | 112722063 A | 4/2021 |
| CN | 113056409 A | 6/2021 |
| CN | 213502564 U | 6/2021 |
| CN | 113147888 A | 7/2021 |
| CN | 114644037 A | 6/2022 |
| CN | 115402404 A | 11/2022 |
| CN | 218367973 U | 1/2023 |
| EP | 1584539 A2 | 10/2005 |
| WO | 2022152249 A1 | 7/2022 |

OTHER PUBLICATIONS

1st Search Report of counterpart Chinese Patent Application No. 202211105656.0 issued on Apr. 25, 2023.
2nd Office Action of counterpart Chinese Patent Application No. 202211105656.0 issued on Nov. 24, 2023.
Notice of Allowance of counterpart Chinese Patent Application No. 202211105656.0 issued on Dec. 14, 2023.
1 European Search Report of European Patent Application No. 23862480.3 issued on Feb. 14, 2025.

* cited by examiner

AUTONOMOUS-DRIVING HYDRAULIC STEERING MODIFICATION CONTROL SYSTEM AND CONTROL METHOD

CROSS REFERENCE TO THE RELATED APPLICATIONS

This application claims priority to Chinese Patent Application No. 202211105656.0, filed with CNIPA on Sep. 8, 2022 and entitled "AUTONOMOUS-DRIVING HYDRAULIC STEERING MODIFICATION CONTROL SYSTEM AND CONTROL METHOD", the entire content of which is incorporated herein by reference.

TECHNICAL FIELD

This application relates to the technical field of autonomous driving, in particular to an autonomous-driving hydraulic steering modification control system and control method.

BACKGROUND

Precision of a hydraulic steering system of a manned driving vehicle is usually low, resulting in a large wheel turning angle error and low response speed, if this type of hydraulic steering system is applied to an autonomous driving scene, the requirement for a steering precision of autonomous driving is hardly met, and being limited by the response speed is not good for improving working condition efficiency of autonomous driving. Besides, if a set of brand-new hydraulic steering system is developed, modification on an original vehicle is large, development cost is high, a structure is complicated, and further, the original vehicle needs to be greatly modified, so a modification efficiency of the original vehicle and time for being put into operation are limited.

SUMMARY

In order to solve one or more technical problems in the prior art or at least provide a beneficial choice, this application provides an autonomous-driving hydraulic steering modification control system and control method, which solves the problems of low precision and low response speed of hydraulic steering at present.

In an aspect, this application provides an autonomous-driving hydraulic steering modification control system, including a steering wheel, a hydraulic steering mechanism and a turning wheel, the hydraulic steering mechanism being connected with the steering wheel and the turning wheel respectively, the steering wheel being connected with the hydraulic steering mechanism through a first rotating shaft and a second rotating shaft, one end of the first rotating shaft being connected with the steering wheel and the other end of the first rotating shaft being connected with one end of the second rotating shaft through a steering connector, the other end of the second rotating shaft being connected with the hydraulic steering mechanism, and a steering motor being arranged on the second rotating shaft and being configured to drive the hydraulic steering mechanism to rotate so as to make the turning wheel rotate.

Further, the steering motor is a double-output-shaft motor.

Further, a transmission mechanism is arranged between the steering motor and the second rotating shaft; and the transmission mechanism includes a pinion connected with an output shaft of the steering motor and a large gear engaged with the pinion.

Further, a preset included angle is formed between the first rotating shaft and the second rotating shaft.

Further, the control system further includes a controller and a turning angle measurement apparatus, the turning angle measurement apparatus is arranged on a steering shaft of the turning wheel, and the turning angle measurement apparatus and the steering motor are electrically connected with the controller respectively.

In another aspect, this application provides an autonomous-driving hydraulic steering modification control method, the method is based on the above autonomous-driving hydraulic steering modification control system, the control system further includes a controller electrically connected with the steering motor, and the control method includes the following steps: obtaining current turning angle data of a turning wheel; comparing the current turning angle data of the turning wheel with expected turning angle data of the turning wheel, and calculating a difference value between the current turning angle data and the expected turning angle data; and judging whether the difference value is within a preset precision range.

Further, a transmission mechanism is arranged between the steering motor and a second rotating shaft; and a transmission ratio of the transmission mechanism is adjusted in the case that the difference value is not within the preset precision range.

Further, the turning wheel is provided with an encoder; and the control method further includes: obtaining an expected rotating speed and expected turning angle data of the steering motor by introducing the difference value into a PID controller; controlling the steering motor to act according to the expected rotating speed and the expected turning angle data of the steering motor; and returning feedback turning angle data collected by the encoder to the controller.

Further, turning angle data of the turning wheel equals (feedback turning angle data of the encoder)*a, where a is a corresponding relationship between data of the encoder and an angle of the turning wheel.

Further, the expected rotating speed of the steering motor equals (an expected rotating speed of the turning wheel)*b; and an expected turning angle of the steering motor equals (an expected turning angle of the turning wheel)*b, where b is a relationship between an angle change of the steering motor and an angle change of the turning wheel.

By adopting the above technical solution, this application has the following beneficial effects:

1. according to the autonomous-driving hydraulic steering modification control system of this application, the steering motor is arranged between the steering wheel and the hydraulic steering mechanism, application to autonomous driving can be met, structures such as an original steering wheel are reserved, manned driving and autonomous driving are compatible, and a vehicle application scene can be extended; further, in this application, by optimizing an arrangement position of the steering motor, specifically, the steering motor is arranged on the second rotating shaft, namely, on the downstream of the steering connector, when the steering motor is started to act on the hydraulic steering mechanism, a mechanical error of the steering connector can be avoided, precision and the response speed of hydraulic steering can be improved, an error between a turning angle of a steering wheel and a turning angle of the turning wheel can be greatly reduced, and the requirement for steering precision of autonomous driving is met.

2. As an implementation, the steering motor is the double-output-shaft motor; and by arranging this type of steering motor, a structure is simple, modification is convenient, cost can be reduced, and modification efficiency can be improved.

3. As an implementation, the transmission mechanism is arranged between the steering motor and the second rotating shaft; the transmission mechanism includes the pinion connected with the output shaft of the steering motor and the large gear engaged with the pinion; and by arranging the transmission mechanism, the transmission mechanism can further improve precision of the steering motor acting on the hydraulic steering mechanism, thus turning angle precision of the turning wheel is improved, and the demand of autonomous driving for driving in a special working condition is met.

4. As an implementation, the preset included angle is formed between the first rotating shaft and the second rotating shaft; by optimizing an arrangement mode of the first rotating shaft and the second rotating shaft, arrangement of the second rotating shaft and the hydraulic steering mechanism may be smoother on the basis of trying not to affect arrangement of the steering wheel, so that transmission from the second rotating shaft to the hydraulic steering mechanism is optimized, and thus transmission precision is improved.

5. As an implementation, the control system further includes the controller and the turning angle measurement apparatus, the turning angle measurement apparatus is arranged on the steering shaft of the turning wheel, and the turning angle measurement apparatus and the steering motor are electrically connected with the controller respectively; thus, the steering motor and the turning angle measurement apparatus are monitored by the controller, namely, the controller compares and processes an actual turning angle of the turning wheel measured by the turning angle measurement apparatus and an expected turning angle provided by the system and controls the steering motor based on this, so that the turning wheel rotates according to expected turning angle data, closed-loop control can be implemented, and it is guaranteed that the steering precision is controlled to be within a range required by autonomous driving.

6. According to the autonomous-driving hydraulic steering modification control method of this application, on the basis of structural modification, by comparing the actual turning angle of the turning wheel with the expected turning angle of the same, a control condition of turning angle precision of the turning wheel can be clearly grasped, meanwhile, a modification achievement can be reflected, guidance data can be provided for the structural modification, namely, can, in turn, serve as a basis of the structural modification, and thus a structural modification strategy is better improved.

7. As an implementation, the transmission mechanism is arranged between the steering motor and the second rotating shaft; the transmission ratio of the transmission mechanism is adjusted in the case that the difference value is not within the preset precision range; in this implementation, by arranging the transmission mechanism between the steering motor and the second rotating shaft, on one hand, transmission precision can be improved, and control over the turning angle precision of the turning wheel is improved, on the other hand, the transmission precision can be better improved by adjusting the transmission ratio, so that the transmission precision is adjustable within an extremely small range, precision of a steering system is easily controlled to be within 1 degree, and thus the demand of autonomous driving for driving in the special working condition is met.

8. As an implementation, the turning wheel is provided with the encoder; the control method further includes: obtaining the expected rotating speed and the expected turning angle data of the steering motor by introducing the difference value into the PID controller; controlling the steering motor to act according to the expected rotating speed and the expected turning angle data of the steering motor; and returning feedback turning angle data collected by the encoder to the controller; and in this application, by associating the controller with the steering motor and the encoder, the closed-loop control can be implemented, the closed-loop control can serve as another guarantee for improving the precision of the steering system, a precision error from the steering motor to the hydraulic steering mechanism can be further compensated, the precision of the actual turning angle of the turning wheel is guaranteed, and use reliability of the whole system is improved.

BRIEF DESCRIPTION OF THE DRAWINGS

Accompanying drawings described here are used for providing further understanding for the present disclosure and constitute a part of the present disclosure, and exemplary embodiments of the present disclosure and their descriptions are intended to explain the present disclosure instead of constituting an inappropriate limitation on the present disclosure. In the accompanying drawings.

REFERENCE NUMERALS IN THE ACCOMPANYING DRAWINGS

Figure 1:
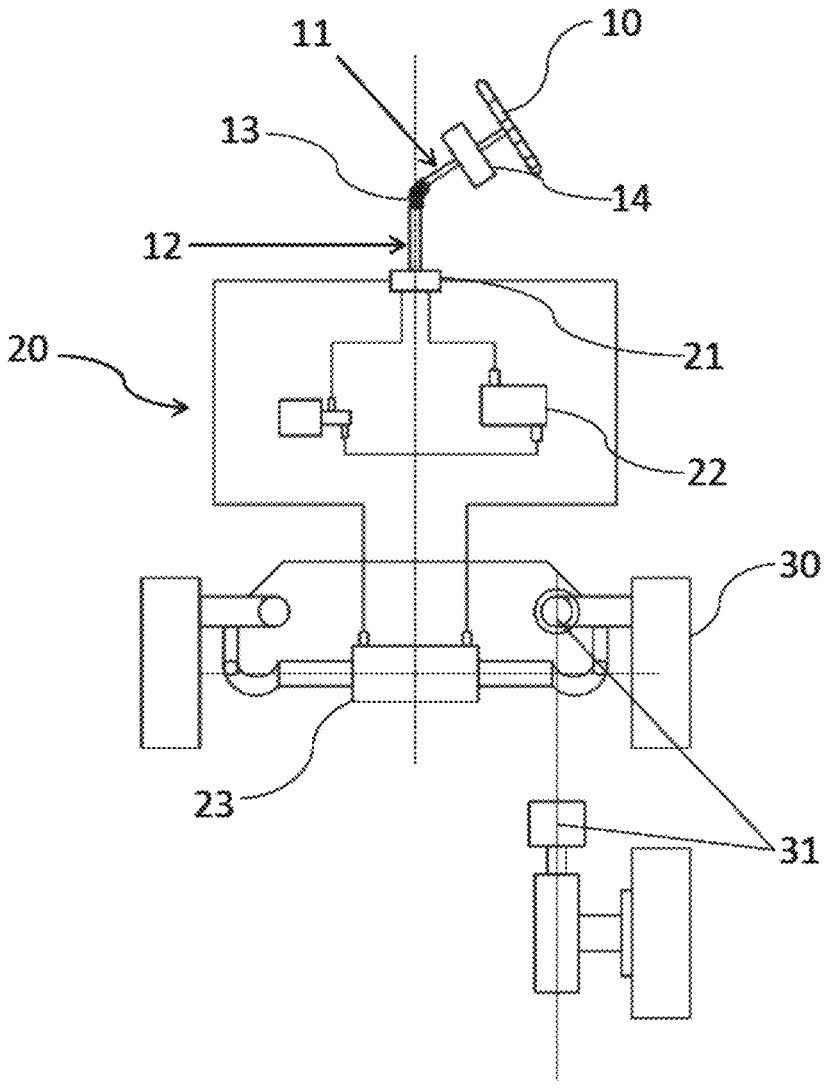
FIG. 1 is a schematic structural diagram of a hydraulic steering modification control system under an implementation of this application.

10—steering wheel, 11—first rotating shaft, 12—second rotating shaft, 13—steering connector, 14—steering motor, 151—pinion, 152—large gear; 20—hydraulic steering mechanism, 21—steering valve, 22—liquid storage tank, 23—steering cylinder; 30—turning wheel, 31—turning angle measurement apparatus.

DETAILED DESCRIPTION OF THE EMBODIMENTS

In order to more clearly explain the whole concept of the present disclosure, a detailed description is made below with reference to the accompanying drawings of the specification by example.

To more clearly understand the above objectives, features, and advantages of this application, the following further describes this application in detail with reference to the accompanying drawings and specific implementations. It needs to be noted that the embodiments in this application and features in the embodiments may be mutually combined without conflicts.

It needs to be noted that many specific details are set forth in the following description to facilitate a full understanding of the present disclosure, but the present disclosure may alternatively be implemented in other manners different from those described herein, and therefore, the protection scope of the present disclosure is not limited by the specific embodiments disclosed below.

Besides, in the description of the present disclosure, it needs to be understood that orientations or position relations indicated by terms such as "center", "upper", "lower", "front", "rear", "left", "right", "vertical", "horizontal", "top", "bottom", "inner", "outer", "axial", "radial" and "circumferential" are orientations or position relations shown based on the accompanying drawings and are only intended to conveniently describe the present disclosure and simplify the description but not to indicate or imply that a referred apparatus or element necessarily has a specific orientation and is constructed and operated in a specific orientation, so as not to be understood as a limitation on the present disclosure.

Besides, terms "first" and "second" are only used for description instead of being understood as indicating or implying a relative significance or implicitly indicating the quantity of referred technical features. Therefore, a feature limited by "first" and "second" may explicitly or implicitly include one or more of this feature. In the description of this application, "a plurality of" means two or more than two unless otherwise limited specifically and clearly.

In the present disclosure, unless otherwise specified and limited clearly, terms such as "mount", "connect", "connected" and "fix" are to be understood in a broad sense, for example, it may be a fixed connection or detachable connection, or be integrated; it may be a direct connection, or an indirect connection through an intermediate medium, and may be an internal communication between two elements or an interactive relationship between the two elements. But it is noted that the direct connection indicates that two bodies that are connected are connected into a whole only through a connection structure without establishing a connection relation through a transition structure. Specific meanings of the above terms in the present disclosure may be understood by those ordinarily skilled in the art according to specific conditions.

In the present disclosure, unless otherwise specified and limited clearly, a first feature being "on" or "below" a second feature may be that the first feature is in direct contact with the second feature, or that the first feature is in indirect contact with the second feature through an intermediate medium. In the description of the specification, a description with reference to terms such as "one embodiment", "some embodiments", "example", "specific example" or "some examples" means that a specific feature, structure, material or characteristic described with reference to the embodiment or example is included in at least one embodiment or example of the present disclosure. In the specification, a schematic statement for the above terms is not necessarily for the same embodiment or example. Besides, the described specific feature, structure, material or characteristic may be combined in any one or more embodiments or example in a proper manner.

Figure 2:
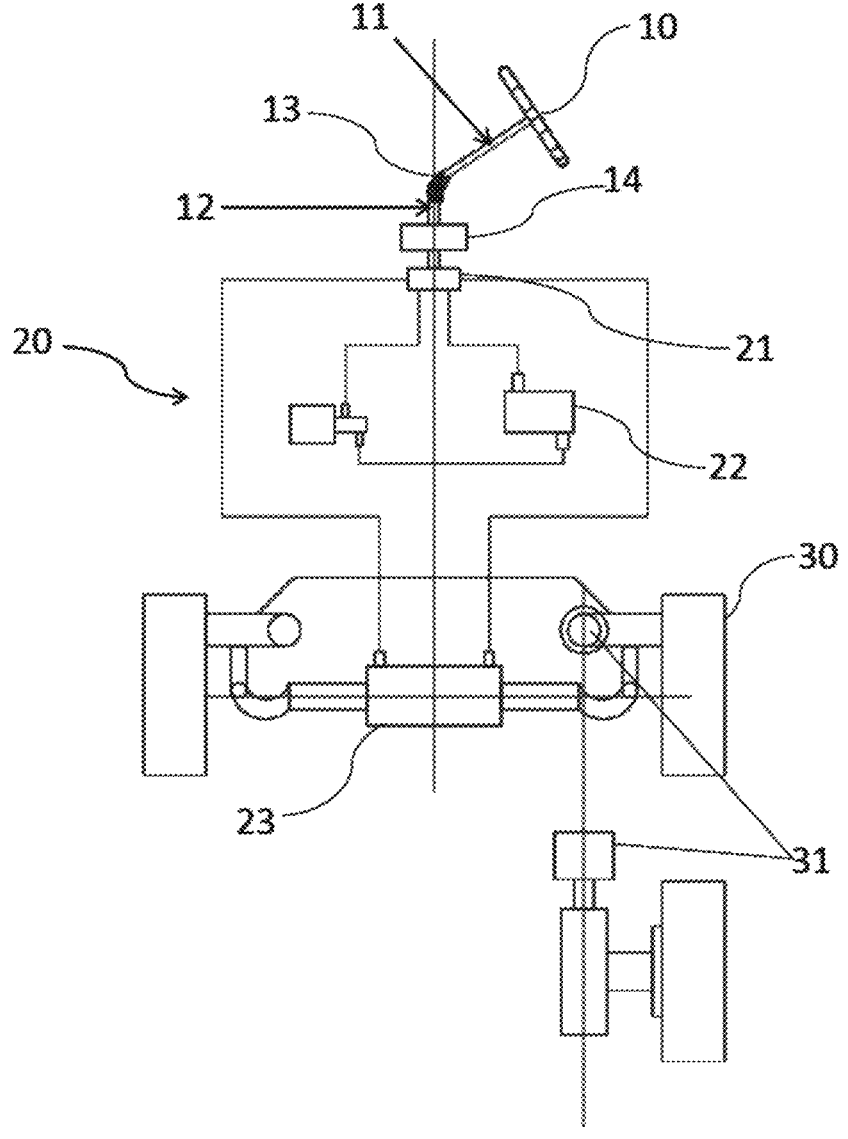
FIG. 2 is a schematic structural diagram of a hydraulic steering modification control system under another implementation of this application.
Figure 3:
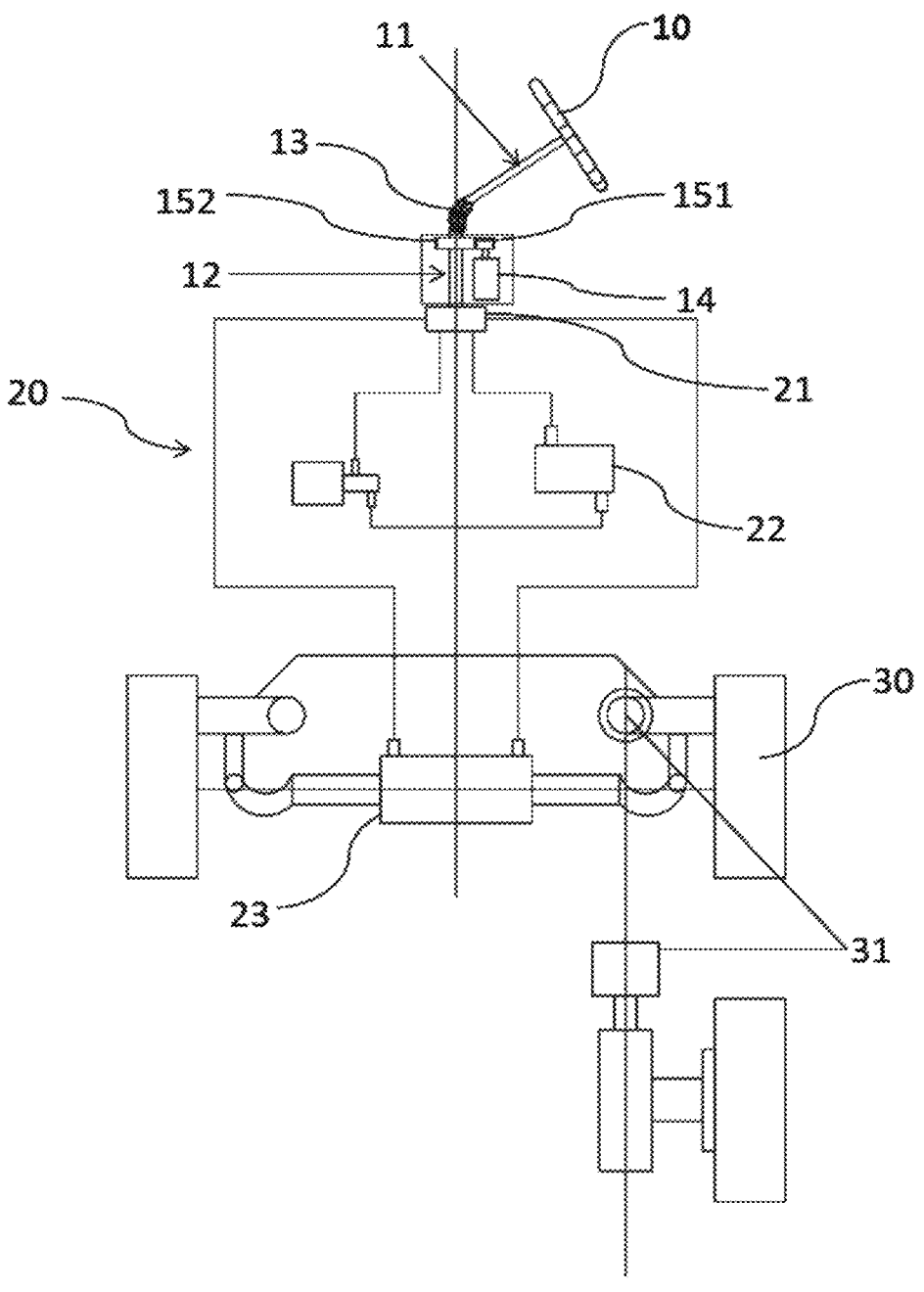
FIG. 3 is a schematic structural diagram of a hydraulic steering modification control system under another implementation of this application.

As shown in FIG. 2 and FIG. 3, this application provides an autonomous-driving hydraulic steering modification control system, including a steering wheel 10, a hydraulic steering mechanism 20 and a turning wheel 30; the hydraulic steering mechanism 20 is connected with the steering wheel 10 and the turning wheel 30 respectively; the steering wheel 10 is connected with the hydraulic steering mechanism 20 through a first rotating shaft 11 and a second rotating shaft 12; one end of the first rotating shaft 11 is connected with the steering wheel 10, the other end of the first rotating shaft is connected with one end of the second rotating shaft 12 through a steering connector 13, and the other end of the second rotating shaft 12 is connected with the hydraulic steering mechanism 20; and a steering motor 14 is arranged on the second rotating shaft 12 and is configured to drive the hydraulic steering mechanism 20 to rotate so as to make the turning wheel 30 rotate.

On one hand, in this application, by additionally arranging the steering motor 14 and making the steering motor act on the hydraulic steering mechanism 20 to make the turning wheel 30 rotate, autonomous driving can be achieved. Meanwhile, this application performs modification on the basis of an original vehicle, the turning wheel 30 may still be driven by the steering wheel 10 to rotate, application of manned driving is maintained, a modification flow may also be simplified, structural configuration may be simplified, cost is reduced, and the modification efficiency is improved.

On the other hand, on the basis of arranging the steering motor 14, an arrangement position of the steering motor 14 has a large influence on the steering precision, as shown in FIG. 1, when the steering motor 14 is arranged on the first rotating shaft 11, transmission from the steering motor 14 to the hydraulic steering mechanism 20 needs to pass through the steering connector 13, and in general, a transmission clearance exists inside the steering connector 13, resulting in the mechanical error which will definitely affect an acting effect of the steering motor 14 on the hydraulic steering mechanism 20, which thus is not good for improving the steering precision. By contrast, as shown in FIG. 2 or FIG. 3, when the steering motor 14 is arranged on the second rotating shaft 12, an error caused by the steering connector 13 to the steering motor 14 can be avoided, namely, it is good for improving the steering precision.

Further, under an manned driving scene, though the steering connector 13 is arranged between the first rotating shaft 11 and the second rotating shaft 12, a user, while manipulating the steering wheel 10, may still use the steering motor 14 for proving an extra assistance force, and thus the error caused by the steering connector 13 can be compensated through a dual function of the steering wheel 10 and the steering motor 14.

Specifically, the steering motor 14 is additionally mounted between the steering wheel 10 and the hydraulic steering mechanism 20, modification on the original vehicle is small, implementation is convenient, modification cost is low, and the modification efficiency is high. The hydraulic steering mechanism 20, with reference to a related structure in the prior art, may include, for example, a steering valve 21, a liquid storage tank 22, a hydraulic pump, a steering cylinder 23, a fluid pipeline and the like, and working principles of the various components may refer to a content in the prior art and are not described in detail here in this application. With regard to the steering motor 14 of this application, the steering motor can drive the steering valve 21 to act on the hydraulic steering mechanism 20 so as to make the hydraulic steering system work and thus drive the turning wheel 30 to rotate.

A structure of the steering connector 13 may be, for example, any one of a steering knuckle, a cardan joint, a coupling assembly, a sprocket transmission mechanism, a gear transmission mechanism, a gear and rack transmission mechanism, and a worm wheel and worm transmission mechanism, which may be arranged according to actual demands and is not limited in this application.

As an implementation of this application, the steering motor 14 is a double-output-shaft motor. In this implementation, output shafts at two ends of the steering motor 14 may be directly coupled with the second rotating shaft 12, so on one hand, motor configuration can be simplified, and on the other hand, assembling can be simplified.

As an implementation of this application, a transmission mechanism is arranged between the steering motor 14 and the second rotating shaft 12; and the transmission mechanism includes a pinion 151 connected with an output shaft of the steering motor 14 and a large gear 152 engaged with the pinion 151.

In this implementation, the steering motor 14 may be arranged as a first-stage precision control, the transmission mechanism may be arranged as a second-stage precision control, the large gear 152 is driven by the pinion 151 for transmission, the precision can be further improved, thus the turning angle precision of the turning wheel 30 is improved, and the turning wheel 30 may reach an ideal turning angle.

As shown in FIG. 3, in this implementation, the steering motor 14 is, for example, a servo motor, and a transmission ratio of the pinion 151 and the large gear 152 may be set according to actual demands, so as to meet the requirement for the steering precision.

As an implementation of this application, a preset included angle is formed between the first rotating shaft 11 and the second rotating shaft 12.

Specifically, as shown in FIG. 2, the second rotating shaft 12 extends, for example, in a vertical direction, so as to facilitate compact configuration and meanwhile optimize a relative arrangement of the second rotating shaft and the hydraulic steering mechanism 20, so a transmission error from the steering motor 14 to the hydraulic steering mechanism 20 is reduced as much as possible. The first rotating shaft 11 is in bending connection with the second rotating shaft 12, for example, an obtuse-angled included angle is formed between the first rotating shaft 11 and the second rotating shaft 12, the first rotating shaft 11 extends towards the steering wheel 10, thus an angle of the steering wheel 10 may be more suitable for a manual use demand, and comfort of manual operation is improved.

As an implementation of this application, the control system further includes a controller and a turning angle measurement apparatus 31, the turning angle measurement apparatus 31 is arranged on a steering shaft of the turning wheel 30, and the turning angle measurement apparatus 31 and the steering motor 14 are electrically connected with the controller respectively.

Specifically, the controller may be configured to obtain measurement data collected by the turning angle measurement apparatus 31 and obtain actual turning angle data of the turning wheel 30 according to the measurement data. Further, the controller may compare the expected turning angle data of the turning wheel 30 provided by the system with the actual turning angle data of the turning wheel 30 and perform processing such as corresponding calculation so as to obtain working parameters such as the expected turning angle and the expected rotating speed of the steering motor 14, therefore, the controller may control the steering motor 14 to act based on the working parameters such as the expected turning angle and the expected rotating speed of the steering motor 14, so as to control the turning wheel 30 to rotate, and meanwhile, the turning angle measurement apparatus 31 may continue measuring a current rotation of the turning wheel 30 and feed a measurement result back to the controller. Therefore, this application may implement closed-loop control and can guarantee that the turning wheel 30 reaches the ideal turning angle. The controller is, for example, an ECU. The turning angle measurement apparatus 31 is, for example, an angle encoder.

It may be understood that in some embodiments, this application may omit the closed-loop control, and the steering precision can be controlled to be within 1 degree, or even within 0.5 degree only by acting on the hydraulic steering mechanism 20 through the steering motor 14. In some other embodiments, in order to guarantee reliability, the closed-loop control may be added, so as to guarantee that the turning wheel 30 reaches the ideal turning angle and improve the response speed, and thus it is adapted to a working condition with a higher requirement.

Figure 4:
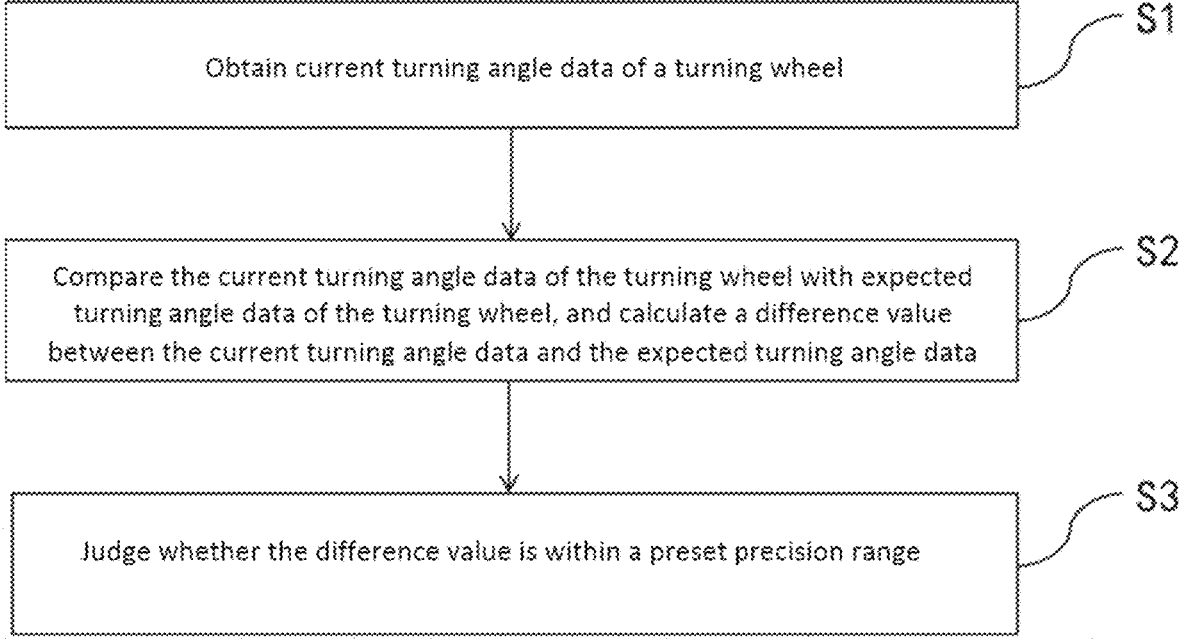
FIG. 4 is a flowchart of a hydraulic steering modification control method under an implementation of this application.

In another aspect, this application further provides an autonomous-driving hydraulic steering modification control method, the control method may be based on the above modification control system, and the control system includes a steering wheel 10, a hydraulic steering mechanism 20 and a turning wheel 30. The steering wheel 10 is connected with the hydraulic steering mechanism 20 through a first rotating shaft 11 and a second rotating shaft 12, a steering connector 13 is arranged between the first rotating shaft 11 and the second rotating shaft 12, and a steering motor 14 is arranged on the second rotating shaft 12. Further, the control system further includes a controller electrically connected with the steering motor 14. As shown in FIG. 4, the control method includes the following steps:

S1: current turning angle data of the turning wheel is obtained.

S2: the current turning angle data of the turning wheel is compared with expected turning angle data of the turning wheel, and a difference value between the current turning angle data and the expected turning angle data is calculated.

S3: whether the difference value is within a preset precision range is judged.

In step S1, measurement data may be collected by using a turning angle measurement apparatus such as an encoder, and the controller may process the measurement data to obtain the current turning angle data of the turning wheel, namely, actual turning angle data of the turning wheel.

Further, in step S2, the controller may also obtain the expected turning angle data of the turning wheel and calculate the difference value between the expected turning angle data and the actual turning angle data of the turning wheel obtained in step S1.

Further, in step S3, the controller may judge whether system steering precision is within the preset precision range according to the above difference value result. For example, when the difference value between the actual turning angle data and the expected turning angle data of the turning wheel is less than 1 (may correspond to an angle of 1 degree), in order to meet the precision requirement, the difference value is within the preset precision range. Otherwise, when the difference value is not within the preset precision range, the controller may provide a prompt such as a warning.

Therefore, the above control method may reflect a modification achievement from application and data and provide a modification evaluation, and when the above difference value is not within the preset precision range, those of related skill may improve the precision control by adjusting a modification strategy, such as replacing a type of the steering motor 14, and adjusting the working parameters of the steering motor 14, so as to meet the situation that the difference value is controlled to be within the preset precision range in above step S3.

Figure 5:
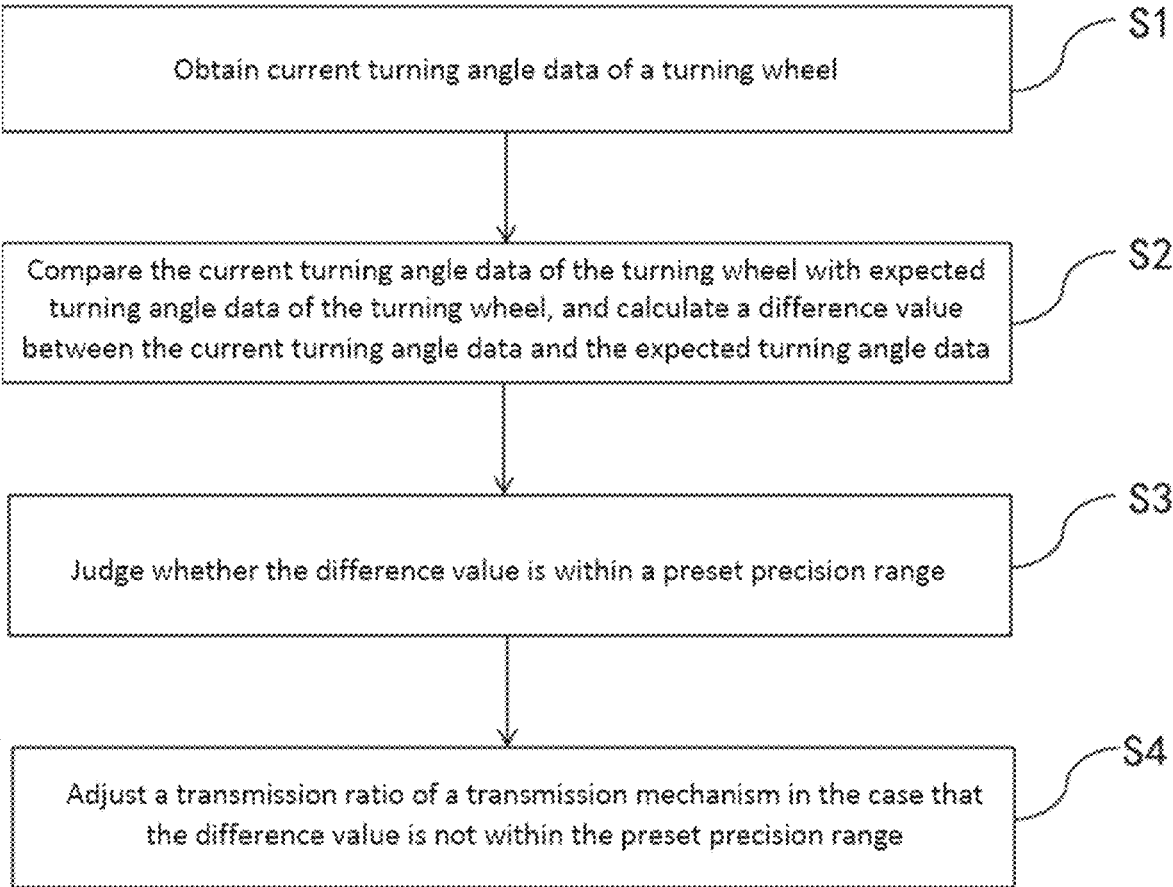
FIG. 5 is a flowchart of a hydraulic steering modification control method under another implementation of this application.

As an implementation of this application, a transmission mechanism is arranged between the steering motor 14 and a second rotating shaft 12. As shown in FIG. 5, the control method further includes:

S4: a transmission ratio of the transmission mechanism is adjusted in the case that the difference value is not within the preset precision range.

Specifically, in some embodiments, the transmission mechanism includes a pinion 151 connected with an output shaft of the steering motor 14 and a large gear 152 engaged with the pinion 151. When the steering precision does not meet the requirement, the transmission ratio may be adjusted by substituting a pinion 151 with the different number of teeth and/or a large gear 152 with the different number of teeth, so that the above difference value range is reduced, and the above difference value is controlled to be within the preset precision range.

In other words, in this application, a modification application effect may be known according to step S3, and when the modification does not meet the precision requirement of autonomous driving, the modification strategy may be adjusted according to step S4, and thus a modification effect is better improved. Besides, the transmission ratio is adjusted so as to correspond to different precisions, conveniently adapt to different working conditions and expand an application scene of autonomous driving.

As an implementation of this application, the turning wheel 30 is provided with an encoder; and the control method further includes:

S5: an expected rotating speed and expected turning angle data of the steering motor are obtained by introducing the difference value into a PID controller.

S6: the steering motor is controlled to act according to the expected rotating speed and the expected turning angle data of the steering motor.

S7: feedback turning angle data collected by the encoder is returned to the controller.

Figure 6:
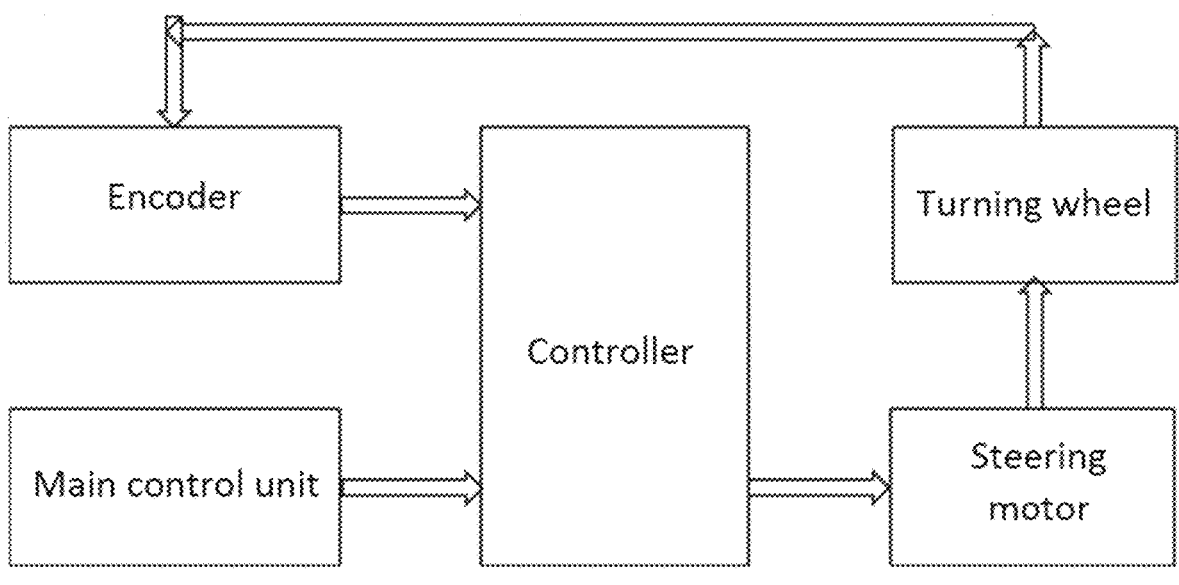
FIG. 6 is a block flowchart of a closed-loop control under an implementation of this application.

With reference to FIG. 6, by arranging the controller, the steering motor 14 and the encoder, closed-loop control can be implemented, and it can be guaranteed that the turning wheel 30 reaches an ideal turning angle. The controller, such as an ECU, may collect the feedback turning angle data of the encoder and obtain the actual turning angle data of the turning angle 30 after processing, the controller further receives an instruction of the expected turning angle data of the turning wheel 30 sent by a main control unit and obtains the expected rotating speed and the expected turning angle data of the steering motor 14 according to the above two types of data, then the controller sends an action instruction/ signal to the steering motor 14, the turning wheel 30 is driven by the hydraulic steering mechanism 20 to rotate, and meanwhile, the encoder feeds a current turning angle of the turning wheel 30 back to the controller, so as to implement closed-loop control over the turning angle of the turning wheel 30 till the turning angle is adjusted in place. Through the closed-loop control, the steering precision can be guaranteed, and meanwhile, the response speed is improved.

Turning angle data of the turning wheel equals (feedback turning angle data of the encoder)*a, where a is a corresponding relationship between data of the encoder and an angle of the turning wheel.

By calibrating a zero point of the encoder and calculating a relationship between the data of the encoder and the angle of the turning wheel, the above parameter a may be obtained, the corresponding relationship may be linear or non-linear, and when the corresponding relationship is non-linear, the corresponding relationship may be obtained by performing curve fitting through repeated sampling.

Further, the expected rotating speed of the steering motor equals (an expected rotating speed of the turning wheel)*b; and an expected turning angle of the steering motor equals (an expected turning angle of the turning wheel)*b, where b is a relationship between an angle change of the steering motor and an angle change of the turning wheel. The parameter b may be obtained by (a maximum value of a turning angle of the steering wheel minus a minimum value of the turning angle of the steering wheel)/(a maximum value of the turning angle of the turning wheel minus a minimum value of the turning angle of the turning wheel).

The technical solution claimed by the present disclosure is not limited by the above embodiments, and it is to be noted that a combination of a technical solution of any embodiment with a technical solution in another embodiment or technical solutions in more embodiments falls within the protection scope of the present disclosure. Though the present disclosure has been described in detail above by using the general description and the specific embodiments, but on the basis of the present disclosure, some modifications or improvements can be made, which are apparent for those skilled in the art. Thus, these modifications or improvements made without departing from the spirit of the present disclosure fall within the scope claimed by the present disclosure.

What is claimed is:

1. An autonomous-driving hydraulic steering modification control method, performed by an autonomous-driving hydraulic steering modification control system, the control method comprising the following steps:

obtaining current turning angle data of a turning wheel of the autonomous-driving hydraulic steering modification control system;

comparing the current turning angle data of the turning wheel with expected turning angle data of the turning wheel, and calculating a difference value between the current turning angle data and the expected turning angle data;

judging whether the difference value is within a preset precision range;

providing a first-stage precision control using a steering motor of the autonomous-driving hydraulic steering modification control system;

adjusting a transmission ratio of a transmission mechanism of the autonomous-driving hydraulic steering modification control system to provide a second-stage precision control in response to the difference value being not within the preset precision range, wherein the transmission mechanism comprises a pinion and a larger gear engaged with the pinion, and the adjusting step comprises substituting the pinion with a different pinion having a different number of teeth and/or substituting the larger gear with a different larger gear having a different number of teeth;

obtaining an expected rotating speed and expected turning angle data of the steering motor by introducing the difference value into a PID controller;

controlling the steering motor to act according to the expected rotating speed and expected turning angle data of the steering motor; and returning feedback turning angle data collected by an encoder of the autonomous-driving hydraulic steering modification control system to a controller of the autonomous-driving hydraulic steering modification control system.

2. The autonomous-driving hydraulic steering modification control method according to claim 1, wherein turning angle data of the turning wheel equals feedback turning angle data of the encoder *a, a being a corresponding relationship between data of the encoder and an angle of the turning wheel.

3. The autonomous-driving hydraulic steering modification control method according to claim 2, wherein the expected rotating speed of the steering motor equals an expected rotating speed of the turning wheel *b; and an expected turning angle of the steering motor equals an expected turning angle of the turning wheel *b, b being a relationship between an angle change of the steering motor and an angle change of the turning wheel.

4. The autonomous-driving hydraulic steering modification control method according to claim 3, wherein the step of controlling the steering motor to act according to the expected rotating speed and expected turning angle data of the steering motor comprises:

controlling a double output shaft motor to act according to the expected rotating speed and expected turning angle data of the double output shaft motor.

5. The autonomous-driving hydraulic steering modification control method according to claim 4, wherein a preset included angle is formed between a first rotating shaft and a second rotating shaft of the autonomous-driving hydraulic steering modification control system.

* * * * *